United States Patent
Klein Gunnewiek et al.

(10) Patent No.: US 8,102,915 B2
(45) Date of Patent: Jan. 24, 2012

(54) MOTION VECTOR FIELDS REFINEMENT TO TRACK SMALL FAST MOVING OBJECTS

(75) Inventors: Reinier Bernardus Maria Klein Gunnewiek, Eindhoven (NL); Frederik Jan De Bruijn, Eindhoven (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1331 days.

(21) Appl. No.: 10/577,105

(22) PCT Filed: Oct. 19, 2004

(86) PCT No.: PCT/IB2004/052142
§ 371 (c)(1),
(2), (4) Date: Apr. 25, 2006

(87) PCT Pub. No.: WO2005/041586
PCT Pub. Date: May 6, 2005

(65) Prior Publication Data
US 2007/0081096 A1    Apr. 12, 2007

(30) Foreign Application Priority Data
Oct. 28, 2003    (EP) .................................. 03103993

(51) Int. Cl.
*H04N 7/12* (2006.01)
*H04N 7/137* (2006.01)
*H04N 7/36* (2006.01)

(52) U.S. Cl. ........... 375/240.16; 375/240.15; 348/416.1; 348/699

(58) Field of Classification Search ............... 375/240.16
See application file for complete search history.

(56) References Cited

U.S. PATENT DOCUMENTS
5,398,068 A * 3/1995 Liu et al. .................. 375/240.16
(Continued)

FOREIGN PATENT DOCUMENTS
EP    0395271    10/1990
(Continued)

OTHER PUBLICATIONS
de Haan, G. et al.: "True-Motion Estimation With 3-D Recursive Search Block Matching", IEEE Transactions on Circuits and Systems for Video Technology, vol. 3, No. 5, Oct. 1993, pp. 368-379.
(Continued)

*Primary Examiner* — Christopher S Kelley
*Assistant Examiner* — Hee-Yong Kim
(74) *Attorney, Agent, or Firm* — DLA Piper LLP (US)

(57) ABSTRACT

A conversion unit for converting a first motion vector field (MVF1) into a second motion vector field (MVF2). The first motion vector field being computed, on basis of a first image and a second image of a sequence of images, for a temporal position between the first and second images. A first establishing means establishes a first group of un-referenced pixels in the first image. A second establishing means establishes a second group of un-referenced pixels in the second image. A computing means computes a match error of a candidate motion vector oriented from the first group of un-referenced pixels to the second group of un-referenced pixels. A comparing means for comparing the match error with a predetermined match threshold and assigning the candidate motion vector to one of the motion vectors of the second motion vector field if the match error is below the predetermined match threshold.

12 Claims, 5 Drawing Sheets

U.S. PATENT DOCUMENTS

Figure 1:
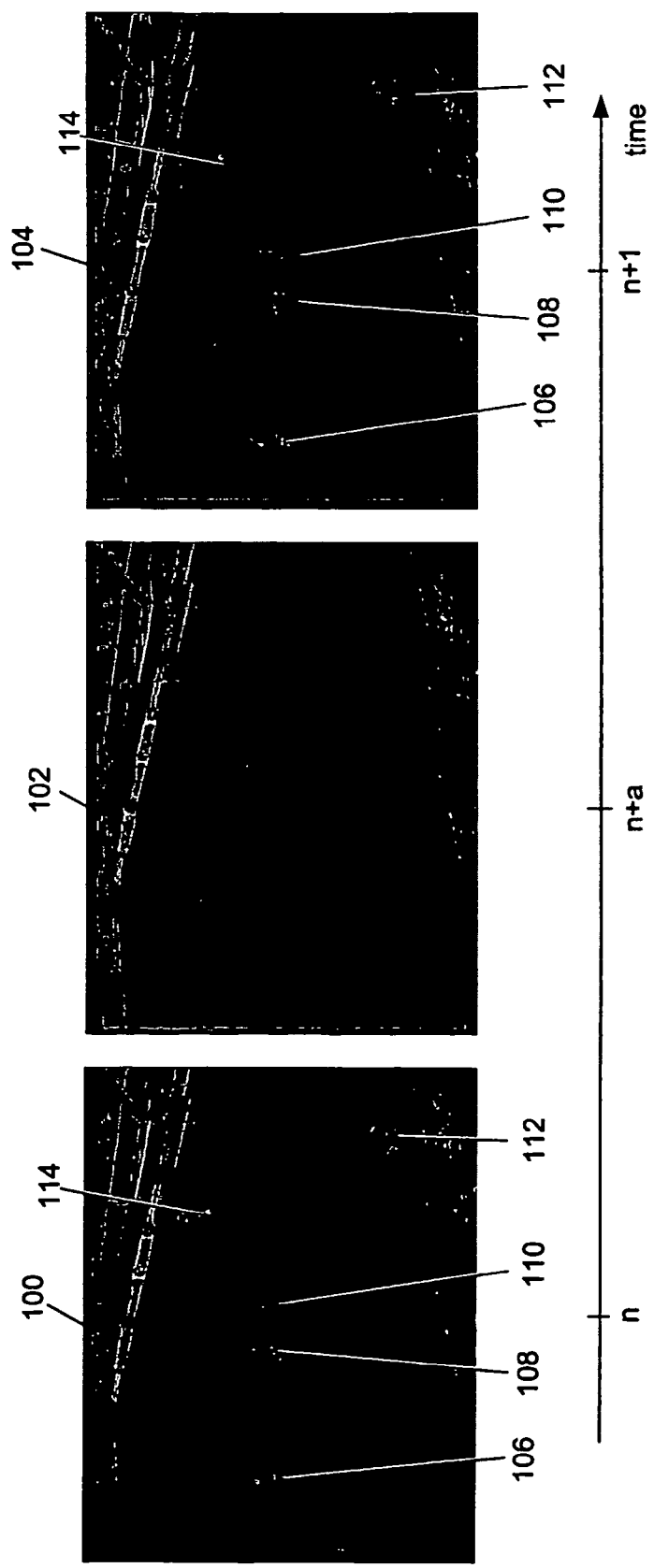

| | | | |
|---|---|---|---|
| 5,477,272 | A | 12/1995 | Zhang et al. |
| 5,619,268 | A * | 4/1997 | Kobayashi et al. ...... 375/240.15 |
| 6,307,888 | B1 | 10/2001 | Le Clerc |
| 2001/0002922 | A1 | 6/2001 | Hayashi |
| 2001/0008545 | A1 | 7/2001 | Takeda et al. |

FOREIGN PATENT DOCUMENTS

| | | |
|---|---|---|
| EP | 1128678 | 8/2001 |
| GB | 2363274 | 12/2001 |
| JP | 2000-69487 | 3/2000 |
| KR | 1997-2967 | 3/1997 |
| KR | 2003-82794 | 10/2003 |

OTHER PUBLICATIONS

Robert, P.: "Temporal Projection for Motion Estimation and Motion Compensating Interpolation", Proceedings of the SPIE—The International Society for Optical Engineering, Visual Communications and Image Processing, 1991, vol. 1605, Nov. 11, 1991, pp. 558-569, XP000479264, Boston, MA USA.

Viarani, E.: "Extraction of Traffic Information From Images At DEIS", Image Analysis and Processing, 1999. Proceedings. International Conference on Venice, Italy, Sep. 27-29, 1999, Los Alamitos, CA, USA, IEEE Comput. Soc, US, pp. 1073-1076, XP010354153, ISBN 0-7695-0040-4.

De Bruijn, F.J. et al.: "Efficient Video Coding Integrating MPEG-2 and Picture-Rate Conversion", IEEE Transactions on Consumer Electronics, vol. 48, No. 3, pp. 688-693, Aug. 2002.

JP Patent Office English abstract of JP 2000-69487, published Mar. 3, 2000, 1 pg.

* cited by examiner

MOTION VECTOR FIELDS REFINEMENT TO TRACK SMALL FAST MOVING OBJECTS

Priority Claims/Related Applications

This application is a 371 U.S. national stage filing of (and claims the benefit and priority under 35 USC 119 and 120 to) PCT/IB2004/052142 filed on Oct. 19, 2004 which in turn claims the benefit and priority under 35 USC 119 to European Patent Application Serial No. 03103993.6 filed on Oct. 23, 2003, the entirety of both of which are incorporated by reference herein.

The invention relates to a method of converting a first motion vector field into a second motion vector field by determining a first one of the motion vectors of the second motion vector field, the first motion vector field being computed, on basis of a first image and a second image of a sequence of images, for a temporal position between the first image and the second image The invention further relates to a conversion unit for converting a first motion vector field into a second motion vector field.

The invention further relates to an image processing apparatus comprising:
  receiving means for receiving a signal corresponding to a sequence of input images; and
  an image processing unit for calculating a sequence of output images on basis of the sequence of input images and on basis of the second motion vector field being provided by such a conversion unit.

The invention further relates to a video encoding unit comprising such a conversion unit.

The invention further relates to a computer program product to be loaded by a computer arrangement, comprising instructions to convert a first motion vector field into a second motion vector field.

In the article "True-Motion Estimation with 3-D Recursive Search Block Matching" by G. de Haan et al. in IEEE Transactions on circuits and systems for video technology, vol. 3, no.5, October 1993, pages 368-379, a so-called motion estimation unit is disclosed. This motion estimation unit is designed to estimate motion vectors on basis of a sequence of input images. These estimated motion vectors can e.g. be used to compute an interpolated output image. A motion vector is related to the translation of a group of pixels of a first image of the sequence to a further group of pixels of a second image of the sequence. Typically the groups of pixels are blocks of pixels of e.g. 8*8 pixels. The set of motion vectors being computed on basis of a set of input images, or applicable to an output image, is called a motion vector field. The cited motion estimation unit is appropriate for real-time video applications. The recursive approach results into relatively consistent motion vector fields.

Estimation of the motion of relatively small objects that move with a high velocity, relative to the background, appears to be a problem. Particularly, in the case that the objects are smaller than the block size being applied by the motion estimation unit, the motion estimation unit occasionally estimates incorrect motion vectors. This is especially the case when the velocity of the objects is larger than the sample distance of the motion vector grid. As a consequence, relatively small objects sometimes disappear in the motion compensated output image. The motion compensated output image is based on temporal interpolation of a number of input images and the motion vector field.

It is an object of the invention to provide a method of the kind described in the opening paragraph whereby the second motion vector field better represents the motion of relatively small objects, compared to the first motion vector field.

This object of the invention is achieved in that the method comprises:
  establishing a first group of un-referenced pixels in the first image, by selecting a first set of mutually connected pixels of the first image for which the first motion vector field does not comprise respective motion vectors;
  establishing a second group of un-referenced pixels in the second image, by selecting a second set of mutually connected pixels of the second image for which the first motion vector field does not comprise respective motion vectors;
  computing a match error of a candidate motion vector, which is oriented from the first group of un-referenced pixels to the second group of un-referenced pixels; and
  comparing the match error with a predetermined match threshold and assigning the candidate motion vector to the first one of the motion vectors of the second motion vector field if the match error is below the predetermined match threshold.

In general, motion compensation, i.e. temporal interpolation, is performed by systematically running true all the pixels of the output image, fetching pixel values from one or more of the original input images. By doing so, no holes will occur in the output image since every output pixel is assigned a value. However, in general, by running through every output pixel, there will be pixels in the original input images that do not contribute to the motion compensated output image. That means, that there are un-referenced in the input images. Typically, un-referenced pixels will occur in occlusion areas, which is a correct and desirable phenomena. The inventors have observed that un-referenced pixels also occur where the motion estimation unit fails to track relatively small objects with a high velocity. The invention is based on this observation. In two input images un-referenced pixels are searched and subsequently linked to each other by means of a candidate motion vector. If the candidate motion vector seems to be appropriate it is assigned to the previously estimated motion vector of which it is then assumed that it should be incorrect. The relation between the two groups of un-referenced pixels and the coordinates of the previously estimated motion vector is given by the spatial coordinates of the two groups of un-referenced pixels and the temporal relation between the two input images and the motion vector field.

Establishing the first group of un-referenced pixels and establishing the second group of un-referenced pixels can be performed independently of each other. However, preferably establishing the second group of un-referenced pixels is based on the first group of un-referenced pixels. An advantage of that dependence is increased efficiency. Another advantage is increased robustness.

In an embodiment of the method according to invention establishing the second group of un-referenced pixels is based a spatial environment of the first group of un-referenced pixels and on a particular motion vector which belongs to the first motion vector field and which is located in the spatial environment of the first group of un-referenced pixels. The first group of un-referenced pixels and the second group of un-referenced pixels must be located relatively close to each other. That means that given the first group of un-referenced pixels, the second group of un-referenced pixels can be found on basis of the spatial location of the first group of un-referenced pixels and a particular offset. That offset is preferably defined by a motion vector, e.g. from the first motion vector field or constructed by taking a particular motion vector from the first motion vector field and adding a predetermined delta to it. The offset might also be zero, i.e. a so-called null motion vector is applied.

In an embodiment of the method according to invention, establishing the second group of un-referenced pixels is based on computing overlap between the first group of un-referenced pixels and a candidate group of un-referenced pixels in the second image. Overlap is related to the first number of pixels of the first group of un-referenced pixels and the second number of pixels of the second group of un-referenced pixels. Besides that, the overlap can be related to the shape of the first group of un-referenced pixels and the shape of the second group of un-referenced pixels. Computing overlap means counting the number of pixels which are un-referenced in both images given a candidate motion vector which defines the relation between the first group of un-referenced pixels and the second group of un-referenced pixels. In the case that a relatively high overlap ratio is established, e.g. above 75 percent the candidate motion vector is assumed to be an appropriate one. Subsequently, the corresponding match error is computed.

Preferably the size of the first group of un-referenced pixels is not too small. Hence, the first number of pixels of the first group of un-referenced pixels is preferably above a first predetermined count threshold. Besides that, the size of the first group of un-referenced pixels is not too big. Hence, the first number of pixels of the first group of un-referenced pixels is preferably below a second predetermined count threshold. The same two conditions are preferably fulfilled for the second group of un-referenced pixels. For a standard definition video image typical values are: first predetermined count threshold equals 4*4 pixels; second predetermined count threshold equals 10*10 pixels.

In an embodiment of the method according to invention, establishing the match error comprises computing differences between respective pixel values of the first and second group of un-referenced pixels. For example, the match error might be the Sum of Absolute Difference (SAD). This match error is a relatively good measure for establishing a match between images parts and which does not require extensive computations.

It is a further object of the invention to provide a conversion unit of the kind described in the opening paragraph whereby the second motion vector field better represents the motion of relatively small objects, compared to first motion vector field.

This object of the invention is achieved in that the conversion unit comprises:
first establishing means for establishing a first group of un-referenced pixels in the first image, by selecting a first set of mutually connected pixels of the first image for which the first motion vector field does not comprise respective motion vectors;
second establishing means for establishing a second group of un-referenced pixels in the second image, by selecting a second set of mutually connected pixels of the second image for which the first motion vector field does not comprise respective motion vectors;
computing means for computing a match error of a candidate motion vector, which is oriented from the first group of un-referenced pixels to the second group of un-referenced pixels; and
comparing means for comparing the match error with a predetermined match threshold and assigning the candidate motion vector to the first one of the motion vectors of the second motion vector field if the match error is below the predetermined match threshold.

It is a further object of the invention to provide an image processing apparatus of the kind described in the opening paragraph whereby the temporarily interpolated output images represent small objects having a relatively high velocity, relatively well.

This object of the invention is achieved in that the conversion unit comprises:
first establishing means for establishing a first group of un-referenced pixels in the first image, by selecting a first set of mutually connected pixels of the first image for which the first motion vector field does not comprise respective motion vectors;
second establishing means for establishing a second group of un-referenced pixels in the second image, by selecting a second set of mutually connected pixels of the second image for which the first motion vector field does not comprise respective motion vectors;
computing means for computing a match error of a candidate motion vector, which is oriented from the first group of un-referenced pixels to the second group of un-referenced pixels; and
comparing means for comparing the match error with a predetermined match threshold and assigning the candidate motion vector to the first one of the motion vectors of the second motion vector field if the match error is below the predetermined match threshold.

The image processing apparatus may comprise additional components, e.g. a display device for displaying the output images. The image processing unit might support one or more of the following types of image processing:

Video compression, i.e. encoding or decoding, e.g. according to the MPEG standard.

De-interlacing: Interlacing is the common video broadcast procedure for transmitting the odd or even numbered image lines alternately. De-interlacing attempts to restore the full vertical resolution, i.e. make odd and even lines available simultaneously for each image;

Image rate conversion: From a series of original input images a larger series of output images is calculated. Output images are temporally located between two original input images; and Temporal noise reduction. This can also involve spatial processing, resulting in spatial-temporal noise reduction.

The image processing apparatus might e.g. be a TV, a set top box, a VCR (Video Cassette Recorder) player, a satellite tuner, a DVD (Digital Versatile Disk) player or recorder.

It is a further object of the invention to provide a computer program product of the kind described in the opening paragraph whereby the second motion vector field better represents the motion of relatively small objects, compared to first motion vector field.

This object of the invention is achieved in that the computer arrangement comprises processing means and a memory, the computer program product, after being loaded, providing said processing means with the capability to carry out:
first establishing means for establishing a first group of un-referenced pixels in the first image, by selecting a first set of mutually connected pixels of the first image for which the first motion vector field does not comprise respective motion vectors;
second establishing means for establishing a second group of un-referenced pixels in the second image, by selecting a second set of mutually connected pixels of the second image for which the first motion vector field does not comprise respective motion vectors;

computing means for computing a match error of a candidate motion vector, which is oriented from the first group of un-referenced pixels to the second group of un-referenced pixels; and comparing means for comparing the match error with a predetermined match threshold and assigning the candidate motion vector to the first one of the motion vectors of the second motion vector field if the match error is below the predetermined match threshold.

It is a further object of the invention to provide a video encoding unit of the kind described in the opening paragraph having an improved compression rate.

This object of the invention is achieved in that the conversion unit comprises:

first establishing means for establishing a first group of un-referenced pixels in the first image, by selecting a first set of mutually connected pixels of the first image for which the first motion vector field does not comprise respective motion vectors;

second establishing means for establishing a second group of un-referenced pixels in the second image, by selecting a second set of mutually connected pixels of the second image for which the first motion vector field does not comprise respective motion vectors;

computing means for computing a match error of a candidate motion vector, which is oriented from the first group of un-referenced pixels to the second group of un-referenced pixels; and comparing means for comparing the match error with a predetermined match threshold and assigning the candidate motion vector to the first one of the motion vectors of the second motion vector field if the match error is below the predetermined match threshold.

Because the eventual motion vector field better represents the actual motion, the video data can be compressed with more efficiency. The residue is less.

Modifications of the conversion unit and variations thereof may correspond to modifications and variations thereof of the image processing apparatus, the method, the video encoding unit and the computer program product, being described.

Figure 2:
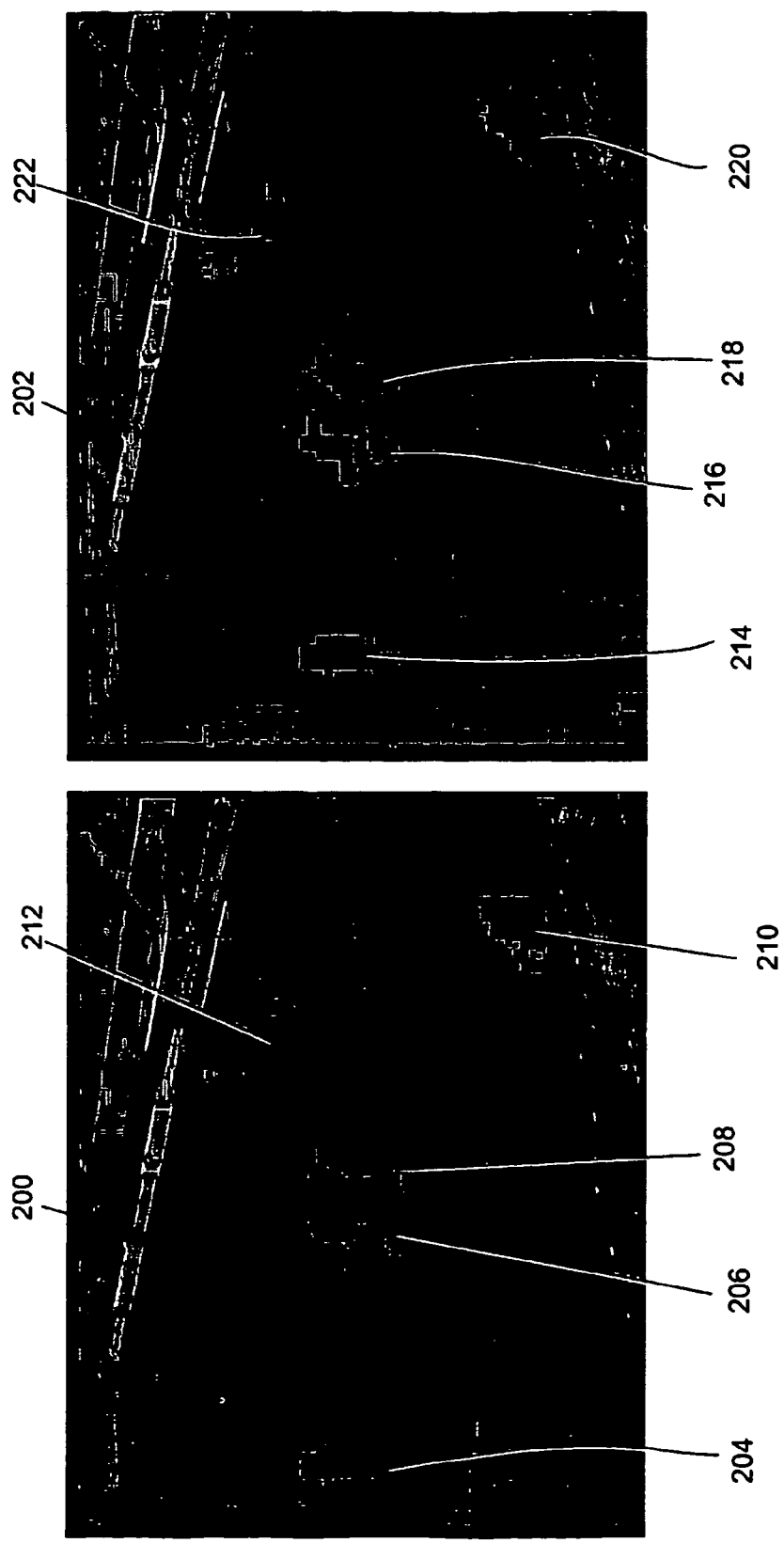
Figure 3:
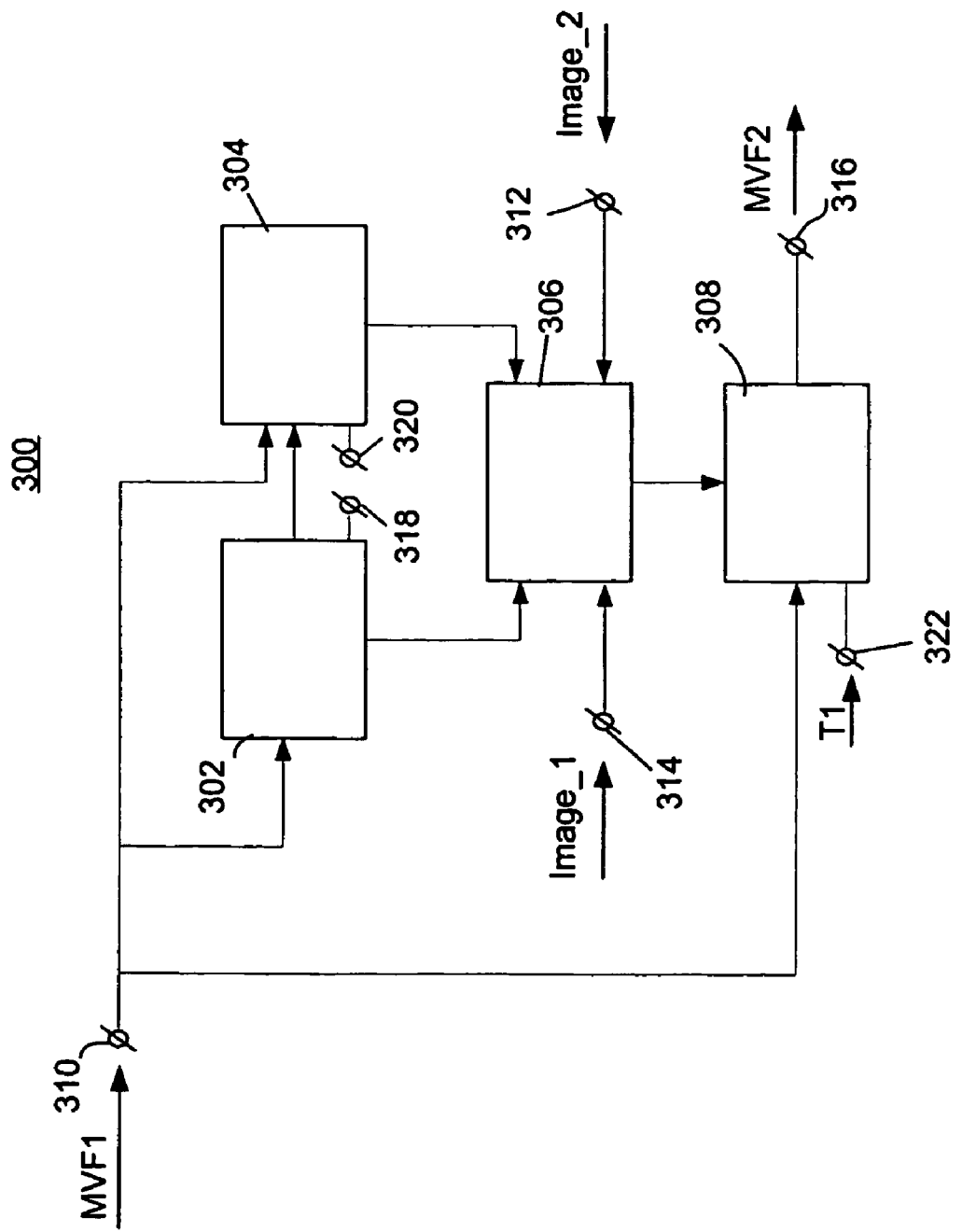
Figure 4:
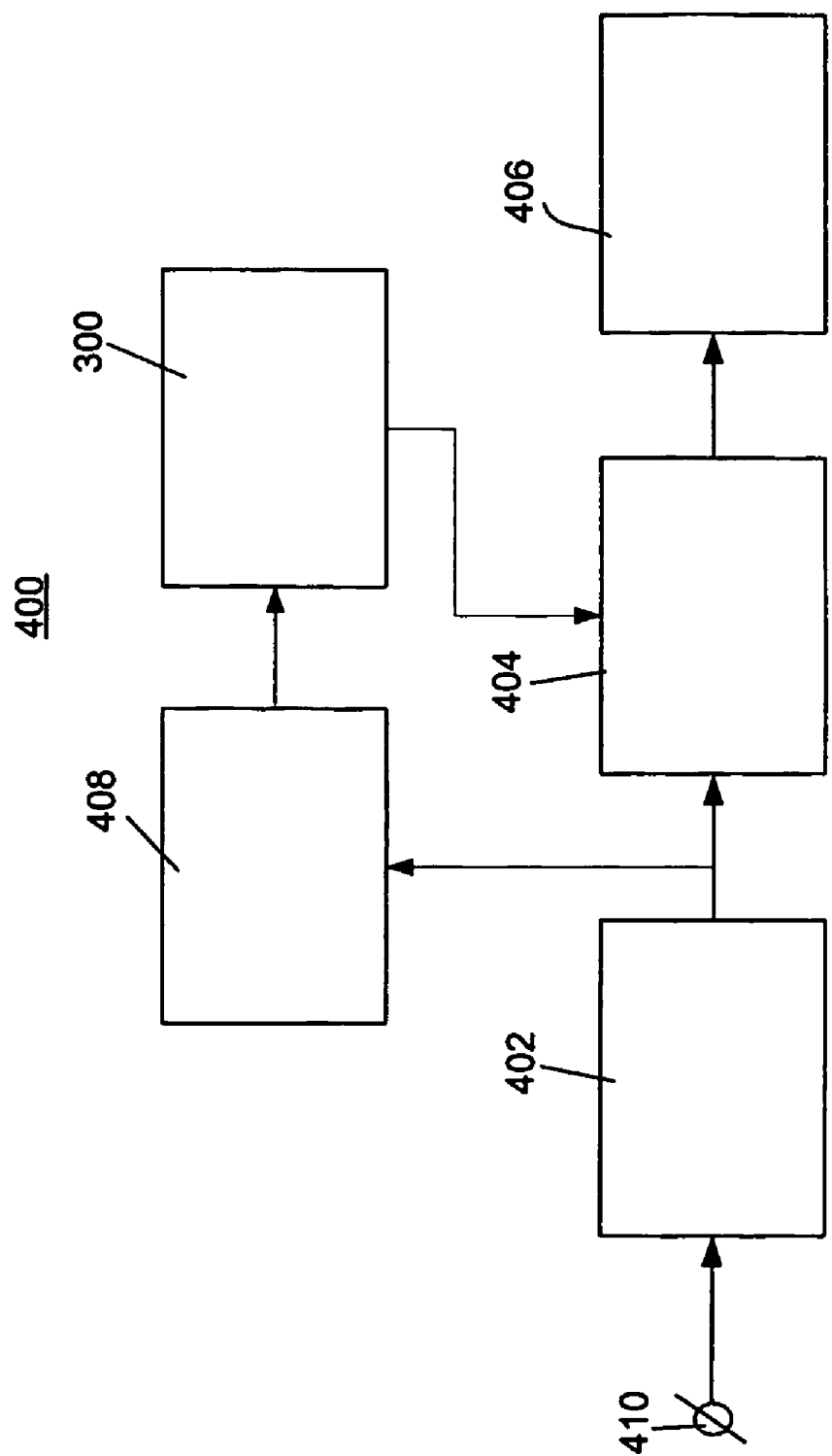
Figure 5:
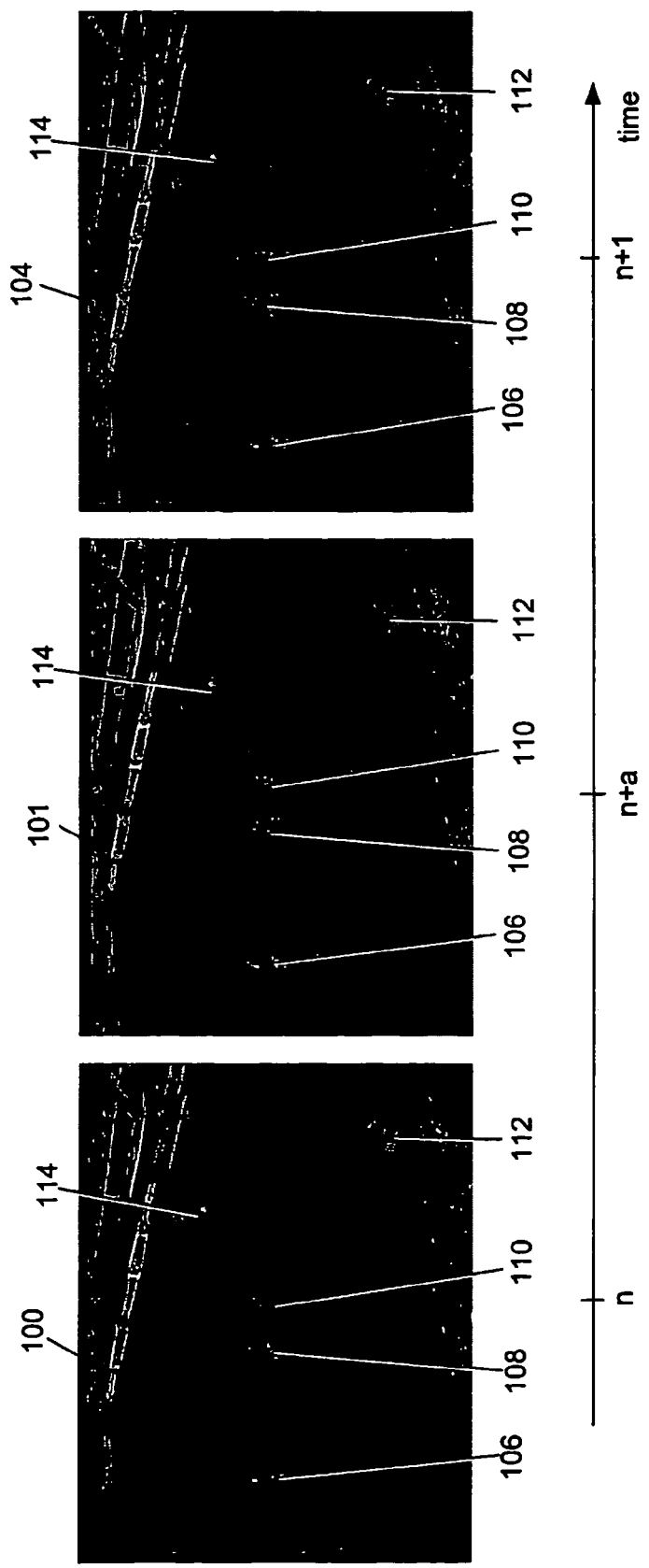

These and other aspects of the conversion unit, of the image processing apparatus, of the method and of the computer program product, according to the invention will become apparent from and will be elucidated with respect to the implementations and embodiments described hereinafter and with reference to the accompanying drawings, wherein:

FIG. 1 shows a sequence of output images whereby one of the output images is interpolated on basis of two input images and a motion vector field being estimated by a motion estimation unit according to the prior art;

FIG. 2 schematically shows in two input images the un-referenced pixels;

FIG. 3 schematically shows a conversion unit according to the invention;

FIG. 4 schematically shows an image processing apparatus according to the invention; and FIG. 5 shows a sequence of output images whereby one of the output images is interpolated on basis of two input images and a motion vector field being updated by means of the conversion unit according to invention.

Same reference numerals are used to denote similar parts throughout the figures.

FIG. 1 shows a sequence of output images whereby one of the output images 102 is computed by means of temporal interpolation on basis of two input images and a motion vector field being estimated by a motion estimation unit according to the prior art. A first one of the output images 100 is equal to a first one of input images. A second one of the output images 104 is equal to a second one of input images. The sequence of input images represent a portion of a soccer match. The camera was panning when making this sequence of input images. In both output images 100, 104 which are direct copies of respective input images, a number of soccer players 106, 108, 110, the linesman 112 and the ball 114 can be seen. The velocities of the players 106, 108, 110, the linesman 112 and the ball 114 relative to the movement of the background, caused by the panning of the camera, are high. Because of that, the motion estimation unit failed to estimate these velocities correctly. Unfortunately, the players 106, 108, 110, the linesman 112 and the ball 114 are not visible in the output image 102 being computed by means of temporal interpolation, because of the incorrect motion estimation. The latter output image 102 only shows an empty soccer field. The viewer of the sequence of output images 100, 102, 104 will observe a flickering sequence: players visible, players visible, players visible, et cetera.

FIG. 2 schematically shows two input images 200, 202 which are overlaid with masks representing un-referenced pixels 204-212, 214-222. That means that, a first input image is merged with a binary map of pixels being un-referenced. These un-referenced pixels are represented as back stripes and blocks in the input image. Being un-referenced means that these pixels have not been used for temporal interpolation of the output image 102 as shown in FIG. 1. The reason that they have not been used is that the estimated motion vector field does not comprise motion vector corresponding to these pixels.

A brief inspection of the two images 200, 202 shows that these two images comprise a number of relatively large regions or groups of un-referenced pixels 204-212, 214-222. The shape and size of the different groups of un-referenced pixels 204-212 of the first 200 one of the two images match relatively well with the shape and size of the different groups 214-222 of the second 202 one of the two images. E.g. a first group of un-referenced pixels 204 of the first 200 one of the two images matches relatively well with a second group of un-referenced pixels 214 of the second 202 one of the two images. Also, a third group of un-referenced pixels 210 of the first 200 one of the two images matches relatively well with a fourth group of un-referenced pixels 220 of the second 202 one of images. The method and conversion unit 300 according to this invention are based on this observation. The method of conversion comprises finding correlated groups of un-referenced pixels in subsequent images which fulfill a number of conditions, like having a size being not too big and not too small, and being located within a spatial environment of each other. The estimated difference between a first spatial location of a first group of un-referenced pixels 204 and a second spatial location of a second group of un-referenced pixels 214 represents a candidate motion vector linking these two groups of un-referenced pixels 204, 214.

A further observation of the two images of FIG. 2 shows that the different groups of un-referenced pixels 204-212, 214-222 correspond with the players 106-110, the linesman 112 and the ball 114. That means that the different groups of un-referenced pixels 204-212, 214-222 correspond with relatively small objects which move with a high velocity relative to the background.

FIG. 3 schematically shows a conversion unit 300 according to the invention. The conversion unit 300 is arranged to convert a first motion vector field MVF1 into a second motion vector field MVF2. The first motion vector field MVF1 is computed, on basis of a first image 100 and a second image 104 of a sequence of images, for a temporal position n+a with 0<a<1, between the first image 100 and the second image 104. The first motion vector field MVF1 is preferably computed by the motion estimation unit as specified in the article "True-Motion Estimation with 3-D Recursive Search Block Matching" by G. de Haan et al. in IEEE Transactions on circuits and systems for video technology, vol. 3, no.5, October 1993, pages 368-379.

With the conversion is meant that a number of motion vectors of the first motion vector fields MVF1 are updated, i.e. replaced by, new motion vectors. Typically, most of the motion vectors of the second motion vector field MVF2 are equal with the respective motion vectors of the first motion vector field MVF1. Typically, only a relatively small number of motion vectors of the second motion vector field MVF2 differ from the respective motion vectors of the first motion vector field MVF1. The motion vectors which have been updated correspond to the movement of relatively small objects. Although, typically only a minor number of motion vectors is updated the eventual result in an interpolated output image might be big. It can be a difference between a football visible in an interpolated output image and the football being invisible in another interpolated output image. Or it can be a difference between a soccer-player being visible or not.

The conversion unit 300 comprises:
  a first establishing unit 302 for establishing a first group of un-referenced pixels in the first image;
  a second establishing unit 304 for establishing a second group of un-referenced pixels in the second image;
  a computing unit 306 for computing a match error of a candidate motion vector, which is oriented from the first group of un-referenced pixels to the second group of un-referenced pixels; and
  a comparing unit 308 for comparing the match error with a predetermined match threshold and assigning the candidate motion vector to the first one of the motion vectors of the second motion vector field MVF2, if the match error is below the predetermined match threshold T1.

The working of the conversion unit 300 is as follows. The conversion unit 300 is provided with the first motion vector field MVF1 at its first input connector 310. On basis of the temporal relation between the first motion vector field MVF1 and the first image 100 the first establishing unit 302 is arranged to determine which of the pixels of the first image are un-referenced. Notice that the first motion vector field MVF1 belongs to t=n+a and the first image belongs to t=n. Being un-referenced means that there is no motion vector in the first motion vector field MVF1 which starts or stops at those pixels. A first intermediate result of this determination process is a binary map of pixels being referenced and pixels being un-referenced (see also FIG. 2). Subsequently, groups of mutually connected pixels are searched in this first intermediate result. This searching is preferably performed by a template matching with a kernel of 4*4 pixels followed by a binary region growing. Eventually a first group of un-referenced pixels is established for the first image 100. The establishing is bounded by lower and upper limits of the size of the first group of un-referenced pixels. These upper and lower limits are provided as count thresholds via a second input connector 318.

Optionally, the searching for un-referenced pixels is controlled by a first investigation of the consistency, i.e. continuity of the first motion vector field MVF1. The probability of finding un-referenced pixels is relatively high in the spatial environment of a discontinuity in the first motion vector field MVF1. Besides that, the match errors of the respective motion vectors of the first motion vector field may be applied to control the searching for un-referenced pixels. The probability of finding un-referenced pixels is relatively high in the spatial environment of a motion vector having a relatively high match error.

In a similar way, the second establishing unit 304 is arranged to determine which of the pixels of the second image are un-referenced. (See also FIG. 2). That means on basis of the temporal relation between the first motion vector field MVF1 and the second image 104.

Having established the first group of un-referenced pixels and a binary map of referenced and un-referenced pixels for the second image 104 the conversion unit 300 starts investigating whether the first group of un-referenced pixels can be matched with a second group of un-referenced pixels in the second image 104. This investigation is based on the spatial location of the first group of un-referenced pixels and a number of spatial offsets. A first one of the spatial offsets equals zero. A second one of the spatial offsets corresponds to a motion vector of the first motion vector field MVF1. A third one of the spatial offsets corresponds to the latter motion vector combined with a delta. For each of the spatial offsets the first group of un-referenced pixels is compared with the binary map of the second image 104. Comparing in this sense means a kind of template matching. In other works, for each spatial offset the overlap between the first group of un-referenced pixels and the "1" values of the binary map of the second image 104 are computed. An spatial offset corresponding to an overlap which is more than 75 percent is assumed to be appropriate as a candidate motion vector.

This candidate motion vector is subsequently evaluated by means of the computing unit 306. The computing unit 306 computes a match error on basis of the spatial offset being provided by the second establishing unit 304, the pixel values of the first input image 100 being provided by means of the third input connector 314 and the pixel values of the second input image 104 being provided by means of the fourth input connector 312. The pixel values can e.g. represent luminance and/or chrominance. Typically, the pixel values of the pixels of the first group and second group of un-referenced pixels are applied.

Then the computed match error and the candidate motion vector are provided to the comparing unit 308. The comparing unit 308 compares the match error with a predetermined match threshold T1, being provided by means of the fifth input connector 322 or derived from external input being provided by the fifth input connector 322. A typical value of the predetermined match threshold T1 equals 48 in the case that the number of luminance levels of the images equals 256 and the size of the first group of un-referenced pixels equals 16 pixels. If the computed match error is below the predetermined match threshold T1, then the candidate motion vector is assigned to the appropriate motion vectors of the second motion vector field MVF2. The coordinates of the appropriate motion vectors are determined on basis of the temporal position of the second motion vector field MVF2 (n+a), the spatial location of the first group of un-referenced pixels and based on the candidate motion vector. It will be clear that the size of the first group of un-referenced pixels is related to the number of the appropriate motion vectors being updated.

The first establishing unit 302, the second establishing unit 304, the computing unit 306 and the comparing unit 308 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 4 schematically shows an image processing apparatus 400 according to the invention, comprising:
- receiving means 402 for receiving a signal representing a sequence of input images;
- a motion estimation unit 408 being arranged to estimate a first motion vector field for a temporal position intermediate a first one of input images and a second one of the input images. The first motion vector field comprises respective motion vectors for the pixels of an image at the temporal position of the first motion vector field;
- a conversion unit 300 as described in connection with FIG. 3, being arranged to compute a second motion vector field;
- an image processing unit 404 being arranged to compute an output image on basis of the sequence of input images and the second motion vector field; and
- a display device 406 for displaying the output images of the image processing unit 404.

The signal may be a broadcast signal received via an antenna or cable but may also be a signal from a storage device like a VCR (Video Cassette Recorder) or Digital Versatile Disk (DVD). The signal is provided at the input connector 410. The image processing apparatus 400 might e.g. be a TV. Alternatively the image processing apparatus 400 does not comprise the optional display device but provides the output images to an apparatus that does comprise a display device 406. Then the image processing apparatus 400 might be e.g. a set top box, a satellite-tuner, a VCR player, a DVD player or recorder. Optionally the image processing apparatus 400 comprises storage means, like a hard-disk or means for storage on removable media, e.g. optical disks. The image processing apparatus 400 might also be a system being applied by a film-studio or broadcaster.

Alternatively, the conversion unit 300 is applied in a video encoding unit. The conversion unit 300 according to the invention is particular of interest for the computation of B frames in e.g. MPEG encoding.

FIG. 5 shows a sequence of output images 100, 101, 104 whereby one of the output images 101 is interpolated on basis of two input images and a motion vector field being updated by means of the conversion unit 300 according to invention. Noticed that the first one 100 and the second one 104 of the sequence of output images are the same as depicted in FIG. 1. However the third one 101 of the sequence of output images as depicted in FIG. 5 substantially differs from the third one 102 of the sequence of output images as depicted in FIG. 1. It can be clearly seen that by applying the updated motion vector field, i.e. the improved motion vector field, a substantially better interpolated output image is computed. Now, the soccer players 106, 108, 110, the linesman 112 and the ball 114 are visible in the total sequence of output images. The viewer of the sequence will not observe the flickering as described in connection with FIG. 1, but will observe a smooth motion portrayal.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words "first", "second" and "third", etcetera do not indicate any ordering. These words are to be interpreted as names. That means e.g. that the first image may precede or succeed the second image.

The invention claimed is:

1. A method of converting a first motion vector field into a second motion vector field by determining a first one of the motion vectors of the second motion vector field, the first motion vector field being computed, on basis of a first image and a second image of a sequence of images, for a temporal position between the first image and the second image, the method comprising:
   establishing a first group of un-referenced pixels in the first image, by selecting a first set of mutually connected pixels of the first image for which the first motion vector field does not comprise respective motion vectors;
   establishing a second group of un-referenced pixels in the second image, by selecting a second set of mutually connected pixels of the second image for which the first motion vector field does not comprise respective motion vectors;
   computing a match error of a candidate motion vector, which is oriented from the first group of un-referenced pixels to the second group of un-referenced pixels; and
   comparing the match error with a predetermined match threshold and assigning the candidate motion vector to the first one of the motion vectors of the second motion vector field if the match error is below the predetermined match threshold,
   wherein establishing the second group of un-referenced pixels is based on a spatial environment of the first group of un-referenced pixels and on a particular motion vector which belongs to the first motion vector field and which is located in the spatial environment of the first group of un-referenced pixels.

2. A method of converting as claimed in claim 1, whereby establishing the second group of un-referenced pixels is based on a spatial environment of the first group of un-referenced pixels and a null motion vector.

3. A method of converting as claimed in claim 1, whereby establishing the second group of un-referenced pixels is based on computing overlap between the first group of un-referenced pixels and a candidate group of un-referenced pixels in the second image.

4. A method of converting as claimed in claim 1, whereby a first number of pixels of the first group of un-referenced pixels is above a first predetermined count threshold.

5. A method of converting as claimed in claim 1, whereby a first number of pixels of the first group of un-referenced pixels is below a second predetermined count threshold.

6. A method of converting as claimed in claim 1, whereby establishing the match error comprises computing differences between respective pixel values of the first and second group of un-referenced pixels.

7. A conversion unit for converting a first motion vector field into a second motion vector field by determining a first one of the motion vectors of the second motion vector field, the first motion vector field being computed, on basis of a first image and a second image of a sequence of images, for a temporal position between the first image and the second image, the conversion unit comprising:
   first establishing means for establishing a first group of un-referenced pixels in the first image, by selecting a first set of mutually connected pixels of the first image for which the first motion vector field does not comprise respective motion vectors;

second establishing means for establishing a second group of un-referenced pixels in the second image, by selecting a second set of mutually connected pixels of the second image for which the first motion vector field does not comprise respective motion vectors;

computing means for computing a match error of a candidate motion vector, which is oriented from the first group of un-referenced pixels to the second group of un-referenced pixels; and comparing means for comparing the match error with a predetermined match threshold and assigning the candidate motion vector to the first one of the motion vectors of the second motion vector field if the match error is below the predetermined match threshold, wherein establishing the second group of un-referenced pixels is based on a spatial environment of the first group of un-referenced pixels and on a particular motion vector which belongs to the first motion vector field and which is located in the spatial environment of the first group of un-referenced pixels.

8. An image processing apparatus comprising:

receiving means for receiving a signal corresponding to a sequence of input images; and an image processing unit for calculating a sequence of output images on basis of the sequence of input images and on basis of the second motion vector field being provided by the conversion unit for converting, as claimed in claim 7.

9. An image processing apparatus as claimed in claim 8, characterized in further comprising a display device for displaying the output images.

10. An image processing apparatus as claimed in claim 9, characterized in that it is a TV.

11. A video encoding unit comprising the conversion unit, as claimed in claim 7.

12. A non-transitory computer-readable medium encoded with a computer program for a method to convert a first motion vector field into a second motion vector field by determining a first one of the motion vectors of the second motion vector field, the first motion vector field being computed, on basis of a first image and a second image of a sequence of images, for a temporal position between the first image and the second image, the method comprising:

establishing a first group of un-referenced pixels in the first image, by selecting a first set of mutually connected pixels of the first image for which the first motion vector field does not comprise respective motion vectors;

establishing a second group of un-referenced pixels in the second image, by selecting a second set of mutually connected pixels of the second image for which the first motion vector field does not comprise respective motion vectors;

computing a match error of a candidate motion vector, which is oriented from the first group of un-referenced pixels to the second group of un-referenced pixels; and comparing the match error with a predetermined match threshold and assigning the candidate motion vector to the first one of the motion vectors of the second motion vector field if the match error is below the predetermined match threshold;

wherein establishing the second group of un-referenced pixels is based on a spatial environment of the first group of un-referenced pixels and on a particular motion vector which belongs to the first motion vector field and which is located in the spatial environment of the first group of un-referenced pixels.

\* \* \* \* \*